UNITED STATES PATENT OFFICE.

ERWIN E. A. G. MEYER, OF DETROIT, MICHIGAN, ASSIGNOR TO MORGAN & WRIGHT, A CORPORATION OF MICHIGAN.

PROCESS OF TREATING RUBBER.

1,218,949.  Specification of Letters Patent.  Patented Mar. 13, 1917.

No Drawing.  Application filed May 18, 1916.  Serial No. 98,286.

*To all whom it may concern:*

Be it known that I, ERWIN E. A. G. MEYER, a citizen of the United States, residing in Detroit, county of Wayne, and State of Michigan, have invented certain new and useful Improvements in Processes of Treating Rubber, of which the following is a full, clear, and exact description.

My invention relates to the compounding or treating of rubber prior to forming it into various articles of manufacture composed of rubber stock, mixed with certain ingredients usually employed in such compounds.

Heretofore in the preparation of rubber stock for molding, vulcanizing, etc., it has usually been the practice to wash the crude rubber, after cutting the same into small pieces, by passing the same between washing rolls in the presence of a stream or flow of water. When different crude rubbers have been used, it has been the custom to wash such crude rubber separately in washing machines or between washing rolls, and after drying by hanging the sheets in a drying room, to compound or mix the same in a mixing machine or between mixing rolls. Furthermore, certain rubbers are often of such a soft and tacky consistency that it is very difficult, if not impossible, to wash the same and hang in the form of sheets in a drying room. My invention, on the other hand, obviates the use of a plurality of machines for washing the rubber separately, and also renders it of such a consistency that the sheets may be easily manipulated and dried.

Briefly stated, the invention consists in combining different varieties of crude rubber, and then blending these varieties on the washing machine while simultaneously washing the mass.

As an example of the improved process the requisite proportions of various kinds of rubber stock, such as for instance plantation rubber and fine para or wild rubber reduced to a condition convenient for handling, are mixed together and the mixture passed through the washing machine or between the washing rolls in the usual way, water being allowed to flow over the rubber during its passage between the rolls. This operation is continued a sufficient time to thoroughly blend the different kinds of crude rubber or to blend them to the extent desired and at the same time wash all impurities therefrom. The stock is then removed from the rolls in the form of sheets and hung in the drying room, or otherwise dried in any usual or preferred way. The mixing of the stocks where parts are of a soft or tacky consistency renders the sheets of such a consistency that they may be easily handled and hung on the usual frames without danger of the stock dropping to the floor. After the stock is dried, it may be further mixed with other ingredients, such as filler, sulfur, etc., and then formed into the requisite shapes or treated in any manner practised in the manufacture of rubber goods.

I have discovered that rubber stock blended in the above manner is far superior to rubber stock which is washed and dried separately, as has always been supposed to be necessary, and the life or resiliency of the rubber is preserved to a much greater degree than when washed and dried separately. Furthermore, my improved process reduces the time necessary to thoroughly mix the rubber, and consequently lessens the expense, owing to a saving in labor, time and number of machines employed.

Having thus described my invention, what I claim and desire to protect by Letters Patent is:

1. In the process of treating rubber, the step which comprises the mixing of different varieties of crude rubber under pressure, in the presence of water.

2. In the process of treating rubber, the step which comprises the blending of different varieties of rubber stock by passing the same between pressure rolls in the presence of water.

3. In the process of treating rubber stock, the steps which comprise the blending of different varieties of rubber stock by passing the same between pressure rolls in the presence of running water, forming the same into sheets, and then drying the compound sheets so formed.

Signed at Detroit, Mich., this 12th day of May, 1916.

ERWIN E. A. G. MEYER.